United States Patent [19]
Falk

[11] Patent Number: 6,141,120
[45] Date of Patent: *Oct. 31, 2000

[54] COLOR CALIBRATION METHOD AND SYSTEM HAVING INDEPENDENT COLOR SCANNER PROFILES

[75] Inventor: Richard A. Falk, Mountain View, Calif.

[73] Assignee: Splash Technology, Inc., Sunnyvale, Calif.

[*] Notice: This patent is subject to a terminal disclaimer.

[21] Appl. No.: 09/015,397

[22] Filed: Jan. 29, 1998

Related U.S. Application Data

[63] Continuation of application No. 08/599,814, Feb. 12, 1996, Pat. No. 5,760,913.

[51] Int. Cl.[7] .................. H04N 1/46; G03F 3/08
[52] U.S. Cl. ........................... 358/504; 358/518
[58] Field of Search .................. 358/504, 518–523, 358/1.9; 382/167, 162

[56] References Cited

U.S. PATENT DOCUMENTS

| | | | |
|---|---|---|---|
| 5,416,613 | 5/1995 | Rolleston et al. | 358/518 |
| 5,809,213 | 9/1998 | Bhattacharjya | 395/106 |
| 5,818,960 | 10/1998 | Gregory, Jr. et al. | 382/167 |

*Primary Examiner*—Kimberly A. Williams
*Attorney, Agent, or Firm*—Fenwick & West LLP

[57] ABSTRACT

A printer calibration method and system uses a personal computer equipped with a color laser server circuit card and a scanner to measure the color effects specific to a printer and to then calibrate print data to adjust for the measured printer effects. Each printer colorant is calibrated by printing a data file using the printer to be calibrated thereby generating a calibration image. The calibration image is next scanned using a scanner coupled to the printing system. The scanned data is compared to the data file which was sent to the printer to determine the relationship (an association) between the data file printed and the resulting calibration image. Color comparisons are made using an absolute density scale and thus the scanned data, being in RGB (Red, Blue, Green) format is converted to absolute density values. To determine the conversion from scanned RGB values to absolute density, a standard gray scale test strip is scanned and compared to a data file containing the known absolute density values which correspond to the test strip.

22 Claims, 6 Drawing Sheets

COLOR CALIBRATION METHOD AND SYSTEM HAVING INDEPENDENT COLOR SCANNER PROFILES

RELATED APPLICATIONS

This application is a continuation under 37 C.F.R. 1.53(b) of application Ser. No. 08/599,814 filed on Feb. 12, 1996 now U.S. Pat. No. 5,760,913.

BACKGROUND OF THE INVENTION

1. Field of the Invention

This invention relates generally to color calibration and particularly to a method and system for calibrating the colorants of a color copying and printing system.

2. Description of the Related Art

Conventionally, color copiers, printers and professional press systems create color images by combining a small number of colorants such as pigments or dyes in response to image data. For example, conventional color systems produce an image by combining cyan, magenta, yellow and black (CMYK) colorants. The same CMYK image data printed using different color reproduction systems can produce images which have different color characteristics. The different color characteristic are due to different absorption spectra of the colorants, different amounts (densities) of the colorants, and different mixing characteristics (trapping) of the colorants.

Color copiers and printers are sometimes used in the color publishing market as prepress design tools to preview color images. When used as a prepress design tool, color copiers and printers (collectively "printers") are adjusted to simulate standard press conditions so that the colors in the locally printed image closely match the colors which result when the data file is printed using standard press conditions. In order to match the printer color characteristics to those of a standard press process, a full color characterization is conventionally performed on a printer model to define the resulting color over a range of colorant densities and combinations. Once a full color characterization is determined for a printer model, image data is adjusted prior to printing to simulate standard press conditions.

Full color characterization is conventionally performed on a single printer or on several of the same model type to determine the color characterization that will be assumed for each printer of the given model type. Even though a given printer will have the same general color characterization, each model can have variances from the assumed characterization. These variances are attributable to many factors including: environmental conditions (e.g., humidity, temperature), the condition of the colorant applicators and the individual adjustments that have been made in servicing the specific printer. In order to compensate for color variances of individual printers within a model type and for printer color variance over time, color calibration techniques are used to calibrate image data to compensate for the color variance as measured specific to the printer.

One conventional characterization/ calibration system uses a generalized approach to characterize and calibrate a variety of printers and scanners to be used in various combinations. This generalized approach compensates for colorant mixing effects (in the printing process) and color decomposition effects (during the scanning or image input process) to color match printed images to input images, for each printer and scanner combination to be used. This conventional approach requires the use of a linear intermediate color space during the printing process which adds computation time and complexity.

Other conventional calibration techniques require the use of special equipment such as a densitometer. Calibration systems requiring the use of a densitometer are undesirable because densitometers are costly and because these conventional calibration systems also require a sophisticated user to perform many steps in the calibration process manually.

Thus, there is a need for a high speed calibration method and apparatus for calibrating image data to match the measured color characteristics of a specific color printer without requiring use of a densitometer and which does not require a sophisticated user.

SUMMARY OF THE INVENTION

In accordance with the present invention, there is provided a high speed calibration method and apparatus for calibrating a printer using a scanner as a densitometer. The scanner is used to measure, for each colorant, an absolute density profile specific to the printer. Each density profile associates the colorant densities which will appear in a printed image to colorant data values printed. This set of density profiles, taken together, form a printer profile. The printer profile is combined with full color characterization profiles previously determined for the printer model. The printer profile and the color characterization profiles are combined to generate calibration data to be applied to each color plane of image data just prior to printing. The calibration data independently calibrates each color plane of image data to adjust data to be printed in accordance with the particular density profiles associated with each colorant and to simulate the color characteristics of a selected printer standard.

To use the scanner as a colorant density measuring device in the process of generating the printer profile, the scanner color decomposition characteristics are first measured and stored in a scanner profile. The scanner profile is a look-up table for mapping scanner RGB (red, green, blue) data to an absolute density scale. The scanner profile is generated by scanning a standard gray scale test strip comprising a plurality of gray scale patches and comparing the scanned test strip data to a stored data file containing density values known to correspond to the test strip. Using the scanner profile, the density profile of each color plane is next measured.

To measure the density profile of each color plane, test data is generated and printed using the printer to be calibrated thereby generating a printed calibration image. Preferably, the calibration image comprises a plurality of single-color-component color patches over a range of densities. The calibration image is next scanned and converted to an absolute density scale using the scanner profile. In one embodiment, the printed calibration image and the gray scale test strip are scanned simultaneously to overcome scan to scan error and to reduce the number of user steps in the calibration process.

After conversion to absolute densities, the scanned calibration image is compared to the originating test data to determine the printer profile. The printer profile defines the relationship (an association) for each printer colorant between the test data and the color density resulting in the printed calibration image. In one embodiment the printer profile is a look-up table having a row of entries for each color plane. The printer profile thus maps absolute density values to corresponding colorant data. Having determined the printer profile, a set of calibration data is computed to negate any unwanted printer effects for each color plane.

In one embodiment, the characterization profile is selected from a stored set of characterization profiles. In this embodiment, the characterization profile contains conversion data for modifying image data to simulate various press conditions including, for example, SWOP Coated printing, Euroscale, Japanese press inks, Toyo and Newsprint. In another embodiment, the characterization profiles are edited by the user to generate any desired density mapping.

Thus, the system and method of the present invention calibrates images received from any input source including images received from a scanner foreign to the calibration system, computer generated images and computer edited images. The calibration is independent of the image source and is performed just prior to printing. The image data is adjusted, on a plane-by-plane basis so that the resulting printed image has color characteristics which are determined by the selected characterization profile. Thus, the printing system is calibrated to compensate for the density variances associated with each colorant as measured specific to the printer and independent of the source of the image data.

DESCRIPTION OF THE PREFERRED EMBODIMENT

Figure 1:
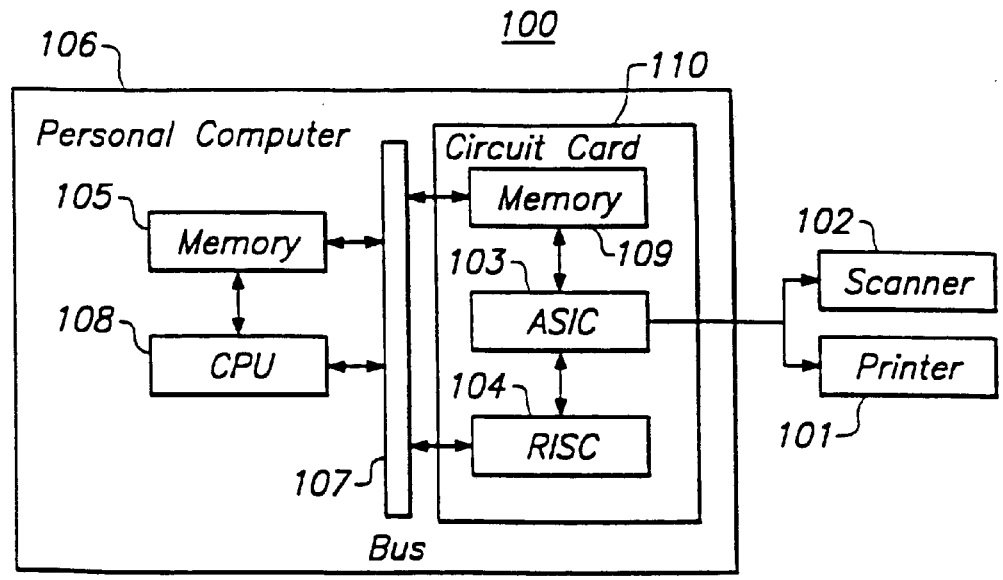
FIG. 1 is a block diagram of an apparatus for practicing the present invention.

There is illustrated in FIG. 1, a functional block diagram of apparatus 100 for practicing the present invention. Apparatus 100 comprises a personal computer 106 equipped with a color laser interface card (circuit card) 110. Circuit card 110 couples personal computer 106 to a scanner 102 and to a printer 101. Personal computer 106 has a general purpose central processing unit (CPU) 108 coupled to a memory (storage device) 105. Personal computer 106 also has an interface bus coupled to storage device 105 and to CPU 108. Circuit card 110 is plugged into a hardware expansion slot and is thereby coupled to bus 107. Circuit card 110 has a reduced instruction set chip (RISC processor) 104 operatively coupled to an application specific integrated circuit (ASIC) 103 as well as storage device 109 operatively coupled to ASIC 103. Storage device 109 and RISC processor 104 are additionally coupled to bus 107 for communication with CPU 108 and storage device 105.

In the preferred embodiment, CPU 108, ASIC 103 and RISC processor 104 perform the steps of the method, although any type or combination of processors or a single processor may be used. In one embodiment, printer 101 is a Xerox brand MajestiK copier and scanner 102 is a scanning device integral to the Xerox brand MajestiK copier. In other embodiments, printer 101 is a Xerox Regal (630/695) or Fuji-Xerox AColor (930/935) color laser copier. The principles of the present invention, however apply to other copier types and brands and to systems having separate printers and scanners.

Figure 2:
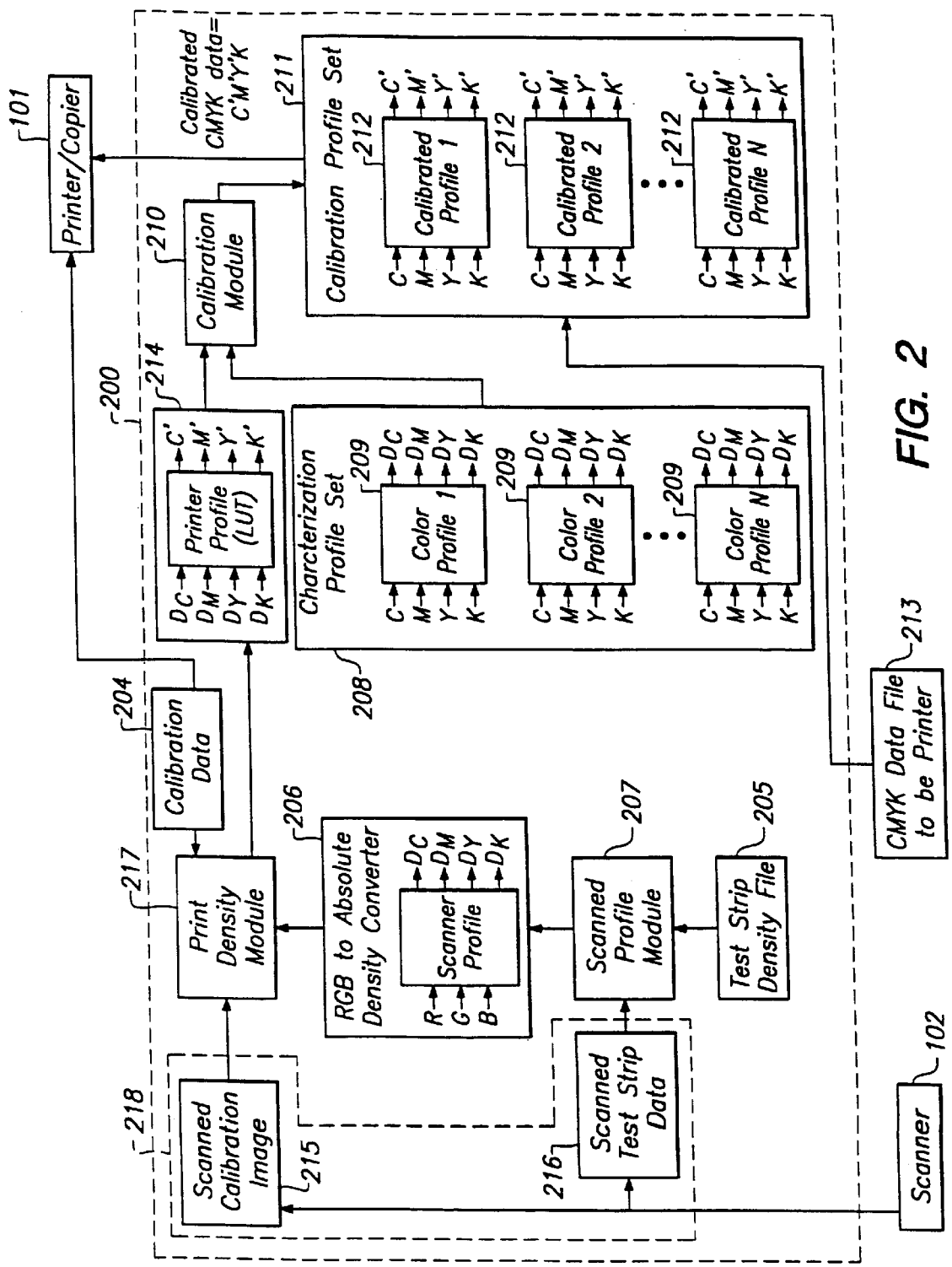
FIG. 2 is a block diagram of a calibration system in accordance with the present invention.

There is illustrated in FIG. 2 a calibration system 200 in accordance with the present invention. Calibration system 200 resides in storage devices 105, 109 and controls the printing on and color calibration of printer 101. Calibration system 200 is operatively coupled to scanner 102 and printer 101. Calibration system 200 calibrates printer 101 by measuring, for each color plane, the printed colorant densities specific to printer 101 and adjusting characterization profile set 208 in accordance with measured colorant densities to generate a calibration profile set 211. Calibration profile set 211 is used during the printing process to adjust (calibrate) each colorant plane (C, M, Y and K) of the image data just prior to printing.

Characterization profile set 208 comprises a plurality of stored printer characterization profiles 209. Each characterization profile 209 associates color plane data (C, M, Y and K) (which correspond to input color data) to absolute density values ($D_C$, $D_M$, $D_Y$, and $D_K$) selected in accordance with a desired print result. In accordance with the present invention, density relates to the amount of colorant. In the preferred embodiment, color characterization profiles 209 are 4×256 byte look-up tables stored by storage device 109. Each look-up table row corresponds to one of the four color planes and each horizontal entry is an absolute density value. In the preferred embodiment, characterization profile set 208 includes characterization profiles for simulating standard press processes including SWOP Coated printing, Euroscale, Japanese press inks, Toyo and Newsprint. In an expert mode, custom color profiles may additionally be defined by the user to generate a desired density mapping, for example to change the gray balance and density of the individual colorants to suite the user's taste or to better match a selected standard. In the preferred embodiment, characterization profiles 209 are additionally stored as a set of user editable bezier curve control points for user display.

Characterization profile set 208 is calculated prior to the colorant calibration process and contains information for compensating for the colorant mixing characteristics determined for the associated printer model.

Calibration profile set 211 comprises a plurality of calibration profiles 212 for calibrating each color plane of a CMYK data file (image data) 213 so that the data, when printed, matches a desired color result (corresponding to a selected color characterization profile) despite the colorant density variance specific to attached printer 101. Calibration profile set 211 is updated each time a user recalibrates printer 101 or each time the user edits any of the characterization profiles 209.

To generate and update calibration profile set 211, calibration system 200 generates printer profile 214. Printer profile 214 is a 4×256 byte look-up table (LUT) stored in storage device 105. Printer profile 214 maps, for each color plane (C, M, Y and K), the absolute density values which result in a printed image to the colorant data printed. Thus, printer profile 214 associates printer data (C, M, Y and K) to the resulting absolute densities of each colorant ($D_C$, $D_M$, $D_Y$, and $D_K$) in a printed image when the colorants are not mixed. Printer profile 214 is generated and updated by calibration system 200.

Scanner profile 206 is a 4×256 byte look-up table for converting RGB data received from scanner 102 to absolute density values ($D_C$, $D_M$, $D_Y$, and $D_K$). During the calibration process, calibration system 200 generates and updates scanner profile 206 which is stored in storage device 105. In the preferred embodiment, scanner profile 206 is used during the calibration process to map the RGB values (derived by scanning calibration image 500) to absolute density values. Thus, during calibration, scanner 102 in combination with scanner profile 206 operates as a colorant density measuring device for measuring the colorant densities on a printed image.

Calibration system 200 also has calibration data 204 stored in memory 105. Calibration data 204 is a test data file (a data structure) comprising C, M, Y, and K colorant data which, when printed produces a calibration image 500 as illustrated in FIG. 5. Printed calibration image 500 has a plurality of single-color-component color patches 501. The single-color-component color patches 501 are color areas each having a colorant density level ranging from level 0 to level 255. In the preferred embodiment, 60 patches 501 are printed for each colorant without calibration. In order to more accurately capture the true zero point of the copier, more patches are used at the lower colorant density levels. For example, in one embodiment, patches 501 are generated every two levels from level 0 to level 40, every 5 levels from level 45 to 215 and every ten levels from levels 225–255. Typically, the color patches are arranged in a grid format in either descending or ascending density levels. Calibration image 500 additionally has registration marks 502 to enable the calibration software to locate the each of the color patches 501 in the event that calibration image 500 is misplaced on the copier glass during scanning step 403 (discussed below in reference to FIG. 4). Calibration image 500 also has orientation arrow 503, test strip placement information 504, gray balance patches 505, text information 506, and time and date information 507.

In an alternative embodiment, each of the color patches 501 are arranged on calibration image 500 in accordance with a pseudo-random sequence rather than in either descending or ascending density level as discussed above. Randomized placement of color patches 501 minimizes the undesirable effects of density variation across a printed page. Typically, such variation is found in either horizontal or vertical bands along a page. In accordance with this embodiment, an arrangement key (preferably a nine bit code, comprising eight data bits and one parity bit) is printed on calibration image 500 so that calibration system 200 can use the key to generate the same pseudo-random sequence that was used to place each of the color patches 501 in order to associate each color patch 501 with a correct absolute density.

In another embodiment, calibration system 200 has an invert option which prints the calibration patches in a mirror image (left and right reversed) as compared to the typical orientation. This option is used when the calibration target is to be printed on transfer paper so that the image can be transferred to other materials (such as rice paper or T-shirts) that are the ultimate destination for the printed output. When calibration system 200 determines that the invert option has been selected, the calibration image 500 is printed in an inverted format, with the inversion occurring about a selected axis, either vertical or horizontal. By printing the calibration target in mirror image form, the user may scan the final output (such as the rice paper or the T-shirt) and calibrate system 200 to include the color effects that are produced in the transfer process. Because calibration image 500 was printed in mirror form, the transferred image has the proper orientation and can be included in the calibration process.

Figure 6:
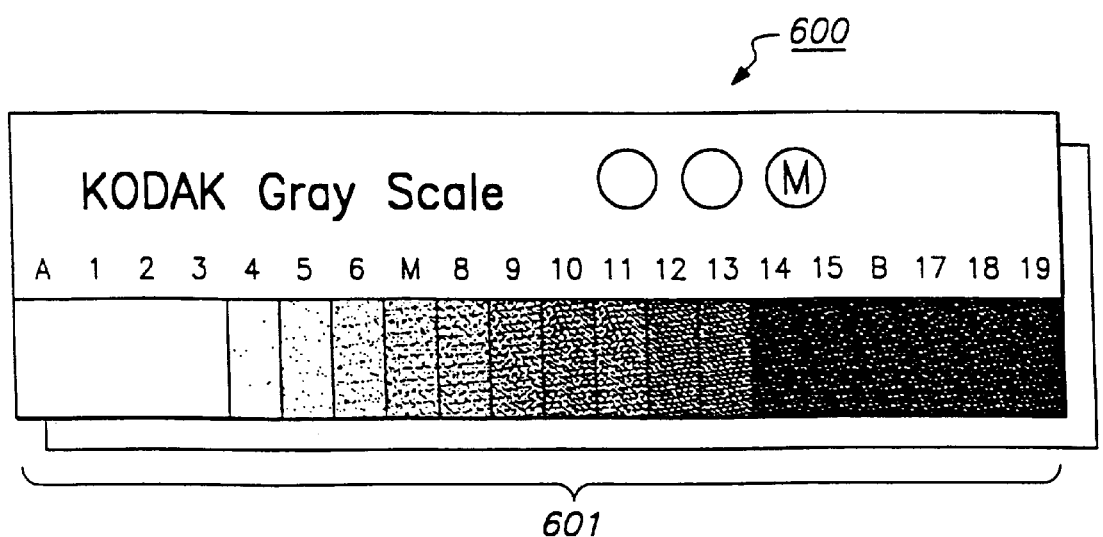
FIG. 6 is a pictorial illustration of a gray scale test strip in accordance with the present invention.

Referring now to FIG. 6, there is illustrated a pictorial diagram of a gray scale test strip 600 used in accordance with the present invention. Test strip 600, is a standard test strip such as a Kodak test strip produced by the Eastman Kodak Corp. of Rochester, N.Y. Test strip 600 has a plurality of gray scale patches 601 each having a known absolute density value. These known absolute density values are stored in a test strip density file 205.

Once printed, calibration image 500 is scanned using scanner 102 to generate an RGB data file (scanned calibration image) 215. Scanned calibration image 215 is stored in memory device 105. Test strip 600 is also scanned to generate a scanned test strip density file 216. Test strip density file 216 thus contains RGB data and is stored in storage device 105. In the preferred embodiment, standard test strip 600 is scanned simultaneous with the scanning of calibration image 500 and thus, test strip data 216 and scanned calibration image 215 are stored in the same data structure, data structure 218.

Calibration system 200 also has several processing modules stored in storage device 105 including calibration module 210, print density module 217 and scanner profile module 207. Calibration module 210 is a processing module operatively coupled to both printer profile 214 and characterization profile set 208. Calibration module 210 combines characterization profile set 208 with printer profile 214 to generate calibration profile set 211 for mapping CMYK input data to calibrated C'M'Y'K' data to be printed.

Scanner profile module 207 is a processing module operatively coupled to test strip density file 205 and test strip data 216. Scanner profile module 207 compares scanned test strip data 216 with test strip density file 205 to determine an association (a mapping) between scanned RGB data and absolute density in the status-T density scale.

In one embodiment, scanner profile module 207 performs statistical analysis to minimize the effects of outlying data caused by printer drop-outs or other small marks or defects in the scanned test strip. For each gray scale patch 601, a sample of data points (50×50=2,500 points/patch) are averaged (to produce a first average) and a standard deviation for each patch is determined. Scanner profile module 207 next calculates a second average for each patch, this time excluding those points that exceed the first average by more than one standard deviation. By computing the second average, the effects of small marks or "drop-outs" on gray scale test strip 600 are minimized.

Scanner profile module 207 next compensates each gray scale patch 601 to adjust for differences in scanning gray values (a combination of multiple colorants) as opposed to scanning pure C, M, Y and K toner values. The adjustment formula adjusts the R, G and B data prior to conversion to a C, M, Y, and K color space in accordance with the following equations:

$$\text{adjusted } R \text{ (for mapping to } C\text{)} = \text{scanned } R + \text{factor1}*(255-\text{scanned } R)^{**}2$$

$$\text{adjusted } G \text{ (for mapping to } M\text{)} = \text{scanned } G + \text{factor2}*(255-\text{scanned } G)^{**}2$$

$$\text{adjusted } B \text{ (for mapping to } Y\text{)} = \text{scanned } B + \text{factor3}*(255-\text{scanned } B)^{**}2$$

$$\text{adjusted } G \text{ (for mapping to } K\text{)} = \text{scanned } G + \text{factor4}*(255-\text{scanned } G)^{**}2$$

where factor1–factor4 are empirically selected to optimize the RGB to CMYK mapping for each printer model. In one embodiment, factor1=0.00020, factor2=0.00055, factor3=0.00000 and factor4=0.000008. In a preferred embodiment, factor1–factor4 are stored in test strip density file 205.

After RGB adjustment, scanner profile module 207 compares adjusted average R, G or B values for each patch to a corresponding density value stored in test strip density file 205 to generate scanner profile 206. Thus, by comparing the stored density values known to correspond to each test strip patch 601 to the adjusted R, G and B values for each scanned test strip patch, an association (scanner profile 206) is generated for converting RGB data to absolute density values.

Figure 7:
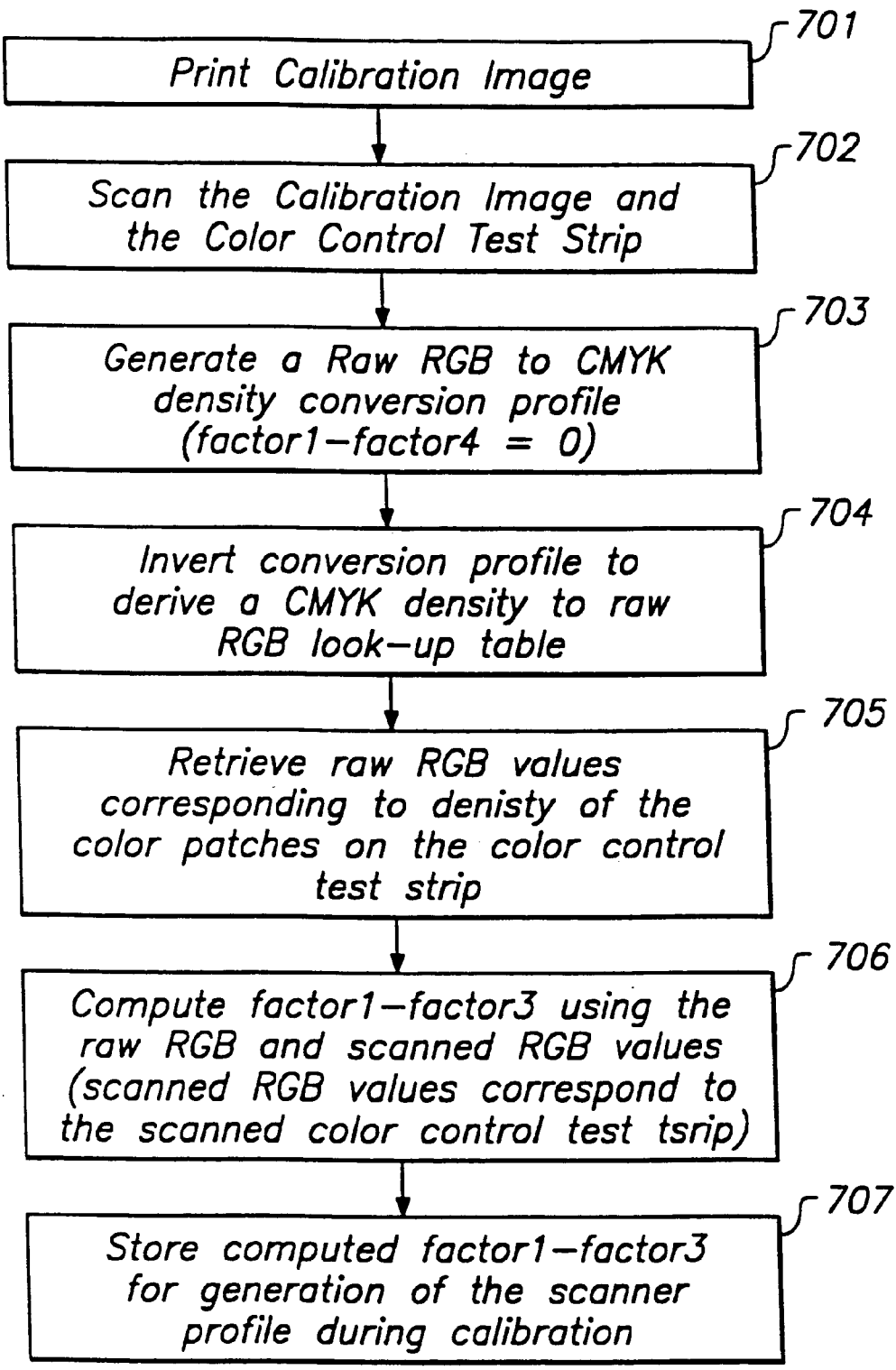
FIG. 7 is a flow diagram of a method of scanner compensation in accordance with the present invention.

In one embodiment, calibration system 200 has an "Adjust Scanner" option which a user may perform prior to printer calibration. The Adjust Scanner option is used to generate a scanner profile 206 which more accurately maps the R, G, B scanner data to absolute density values by measuring and incorporating color characteristics specific to the scanner. When the Adjust Scanner option is selected, calibration system 200 calculates factor1–factor3 and uses the calculated factors in place of the empirically determined factors in the generation of the scanner profile 206 which will be used during calibration. In this embodiment, factor1–factor3 are calculated in accordance with the following method, illustrated in FIG. 7.

Calibration system 200 prints 701 a target print having placement information that instructs a user where to place test strip 600 and where to place a color control test strip so that both can be located in scanned data. The color control test strip has at least three color patches: one of pure (100%) cyan, one of pure (100%) magenta and one of pure (100%) yellow. This embodiment of calibration system 200 additionally has a stored data structure containing the known absolute densities of each of the pure color patches. After simultaneously scanning 702 both test strip 600 and the color control test strip, calibration system 200 generates 703 a raw RGB scanner profile 206 using 0 values as the adjustment factors (factor1–factor4) rather than the empirically derived factors stored in test strip density file 205. By setting factor1–factor4 equal to zero, the resulting scanner profile maps raw RGB data to C, M, Y and K absolute density. The scanner profile is then inverted 704 so that the raw R, G and B can be retrieved from absolute density values. Using the inverted raw scanner profile 206, calibration system 200 retrieves 705 raw R, G and B values corresponding to the respective known absolutes density values of the color control test strip. Using the raw R, G and B values and the scanned R, G and B values of the color control test strip, factor1–factor3 is calculated 706 in accordance with the following equations:

$$factor1 = (raw\ R\text{-}scanned\ R)/(255\text{-}scanned\ R)^{**}2$$

$$factor2 = (raw\ G\text{-}scanned\ G)/(255\text{-}scanned\ G)^{**}2$$

$$factor3 = (raw\ B\text{-}scanned\ B)/(255\text{-}scanned\ B)^{**}2$$

No calculation is made for factor4 which is used in adjustment of the G values used to obtain the K density values. Once calculated, the factors (factor1–factor3) are stored 707 in test strip file 205, replacing the previously stored factors. Thus, the Adjust Scanner option of calibration system 200 computes new values for factor1–factor3 to improve the resulting calibration when calibration system 200 operates in a calibration mode. Using this method to calculate factor1–factor3 typically provides adjustments to compensate for the specific spectral response curves of the filters that filter the light that goes to the CCD array of the scanner. Typically, the spectral response curves vary slightly from scanner to scanner but do not change over time.

Referring again to FIG. 2, Print density module 217 is a processing module operatively coupled to scanned calibration image 215, calibration data 204 and to scanner profile 206. Print density module 217 uses scanned calibration image 215, calibration data 204 and scanner profile 206 to generate printer profile 214. Print density module 217 locates registration marks 502 within stored data structure 218. Using registration marks 502 to establish an orientation within data structure 218, print density module 217 locates scanned calibration image 215 and color patches 501. For each color patch 501, print density module 217 computes a first average and a standard deviation over a sample of data points (100×100=10,000 points/patch). Print density module 217 next calculates a second average for each color patch 501, this time excluding those points that exceed the first average by more than one standard deviation. By computing the second average, the effects of small marks or "drop-outs" on calibration image 500 are minimized. Print density module 217 uses scanner profile 206 to convert the second averages to absolute density values $D_C$, $D_M$, $D_Y$, and $D_K$. The absolute density values are then compared to (associated with) calibration data 204 to generate a CMYK-to-density association. Print density module 217 next inverts the CMYK-to-density association to generate a density-to-CMYK association which is then interpolated and smoothed to generate printer profile 214 for associating absolute density values to CMYK print data.

Figure 3:
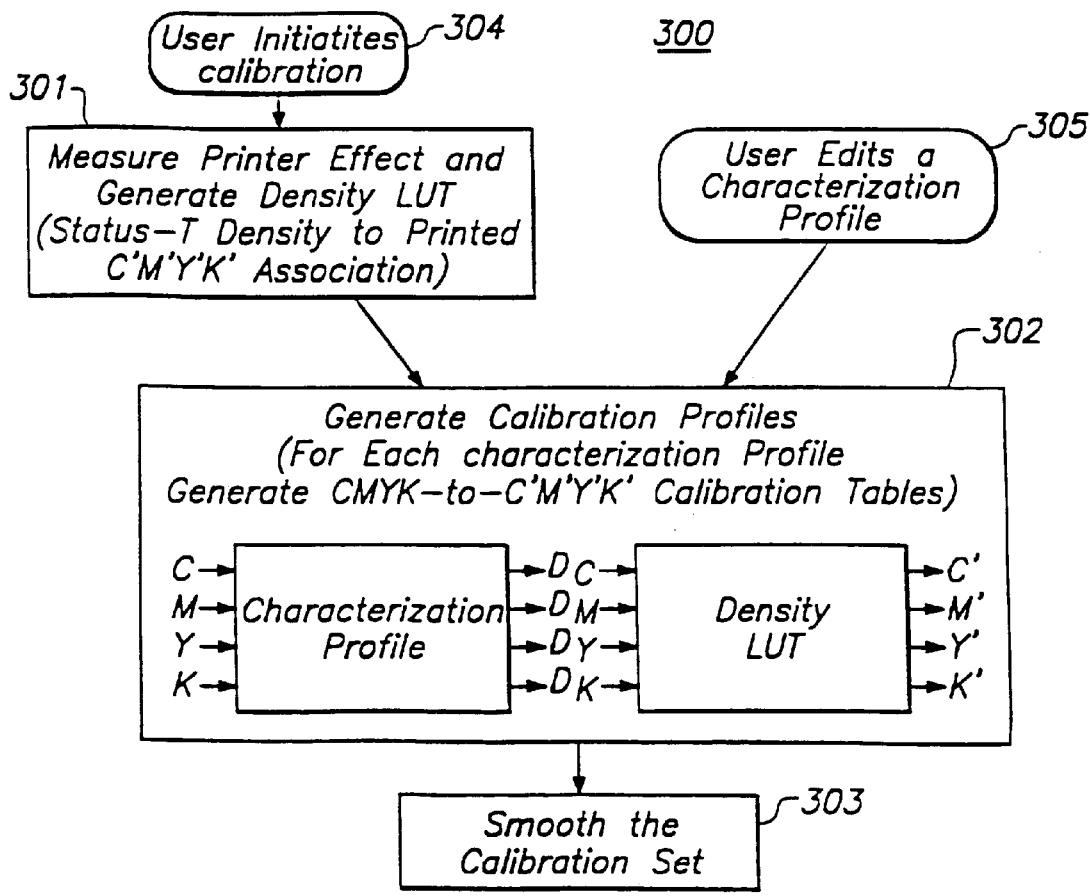
FIG. 3 is a flow diagram of calibration steps in accordance with the present invention.

Referring now also to FIG. 3, there is illustrated a flow diagram of a calibration method 300 in accordance with the present invention. Upon initiation 304 by a user, printer 101 is calibrated by measuring the color effects of printer 101 and generating 301 an association such as printer profile 214 which defines, for each colorant, the density of the printed colorants that result from printing a given range of CMYK data. Once printer profile 214 is generated 301, calibration profile set 211 is generated 302 using characterization profile set 208 and printer profile 214. Preferably, calibration profiles 212 are additionally data smoothed 303 to reduce the effects of anomalous and outlying data.

In a preferred embodiment a user may edit 305 characterization profile set 208. After, characterization profile set 208 is user-edited 305, calibration system 200 generates 302 an updated calibration profile 212 using stored printer profile 214. Because printer profile 214 is stored, calibration profile 212 is updated without having to re-measure the density profile of printer 101.

Figure 4:
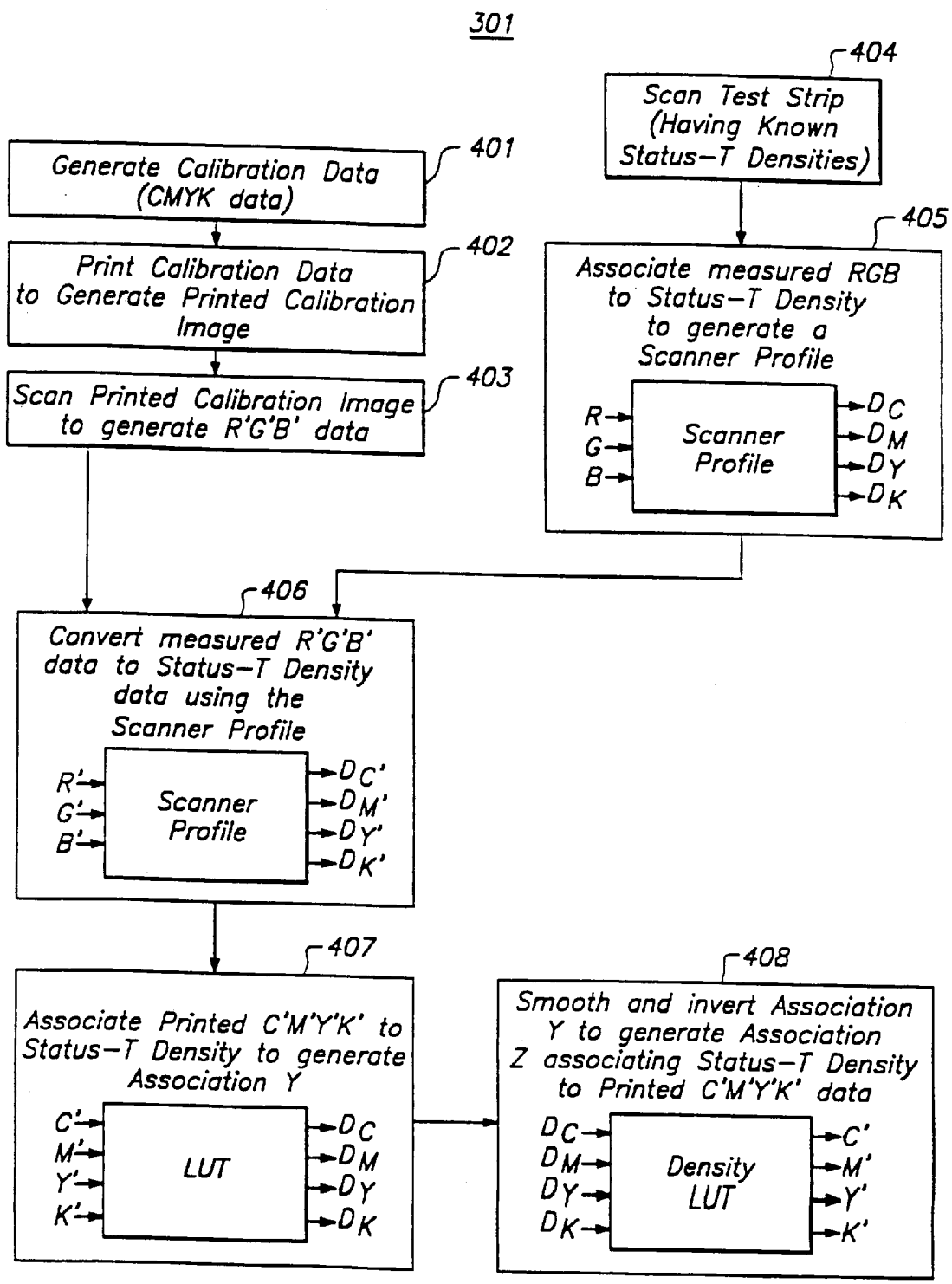
FIG. 4 is a flow diagram of calibration steps in accordance with the present invention.
Figure 5:
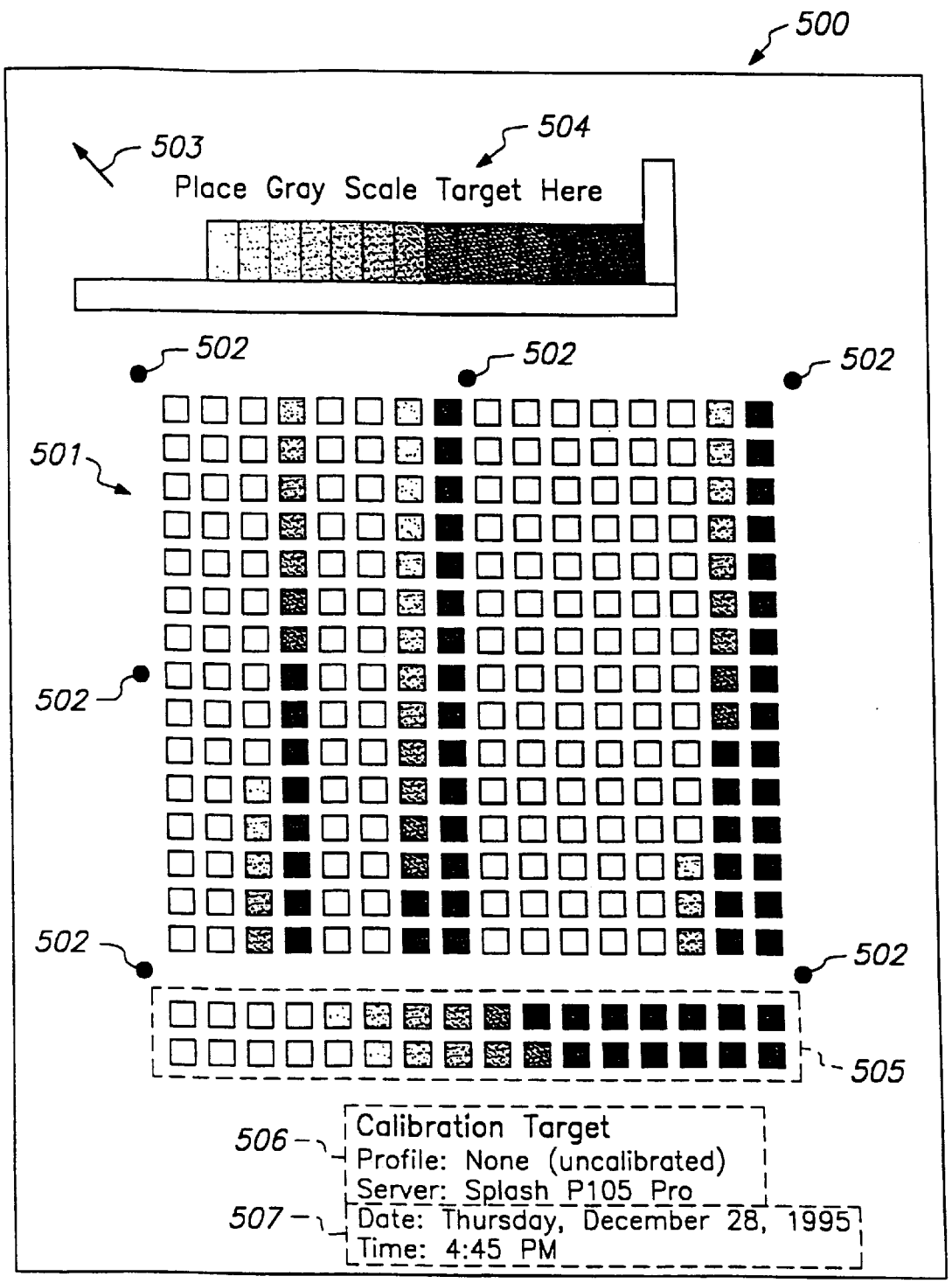
FIG. 5 is a pictorial illustration of a calibration image in accordance with the present invention.

FIG. 4 is a flow diagram of a method for measuring printed colorant density and generating 301 an association (such as printer profile 214) for mapping absolute density values to copier 'raw' C', M', Y' and K' colorant data. Calibration data (test data) is generated 401 by either calculating data values using a pre-defined algorithm or by retrieving data values from a stored data file. The calibration data is next printed 402, using the printer to be calibrated, to generate a printed calibration image such as calibration image 500 illustrated in FIG. 5.

The printed calibration image has absolute density values which vary with each printer 101 and its current adjustment Thus, a calibration image printed on a first printer may have absolute density values different from a calibration image printed on a second printer.

After printing 402 a calibration image, the calibration image is scanned 403 to generate a stored data file such as scanned calibration image 215 containing RGB data. A gray scale test strip is also scanned 404 to generate a second data file such as scanned test strip data 216 also containing RGB data. Although the test strip and the printed calibration image can be scanned at different times, in the preferred embodiment, the test strip and the printed calibration image are scanned simultaneously. Simultaneous scanning is preferred to eliminate the effect of scan-to-scan errors and to reduce the number of steps required to perform calibration.

After standard test strip 600 is scanned 404, the scanned RGB data (such as scanned test strip data 216) is compared to a stored test strip density file to generate 405 an association which maps (converts) RGB data received from scanner 102 to absolute density values. In the preferred embodiment, the association is a look-up table (scanner profile 206). The association may alternatively be defined by a set of equations or any other method which defines a transform.

Using the association between scanned RGB values and absolute density values, the scanned calibration image, which is in RGB format, is converted to absolute density values. These converted absolute density values correspond to the absolute densities of a plurality of color areas on the printed calibration image previously printed using printer 101. The converted absolute density values are compared to the calibration data corresponding to the printed calibration image to generate 407 a mapping (an association) between CMYK data values printed by printer 101 and the absolute density values actually printed by printer 101. The mapping from printed C', M', Y', and K' to $D_C$, $D_M$, $D_Y$, and $D_K$ is inverted and data smoothed to generate a printer profile.

After generating 301 a printer profile, the printer profile is combined with stored color characterization profiles to generate 302 calibration profiles for mapping C, M, Y, K data to calibrated C', M', Y', K' data. During a print operation, the calibration profiles are used to calibrate a C, M, Y, K format image received from any input source just prior to printing on printer 101.

Thus, using scanner 102 as a densitometers the system and method of the present invention measures the printer effects on each color plane of the image data and integrates the measured printer effects with color characterization profile set 208 to generate a calibration profile set 211. Calibration profile set 211 is used to calibrate input image data 213 prior to printing on printer 201. Input image data 213 is calibrated so that input image data 213, when printed by printer 201 has a desired color characteristic despite the measured printer effects specific to the associated printer 201. In one embodiment, characterization profile set 208 includes a characterization profile selected to operate as a standard color management profile for the calibration system. The standard color management profile is not intended to simulate a standard press condition but instead is selected to effect general color management.

Therefore, in accordance with the present invention, after the user performs the calibration process or edits a characterization profile, the calibration profile set 211 is updated for use during the printing process. Once calibrated, the printing system adjusts image data received from any input source or which has been edited by a user. The image data to be printed is adjusted, on a plane-by-plane basis using a selected calibration profile, to compensate for the color effects introduced by the specific printer as measured during the calibration process.

Because the calibration adjustment requires only a plane-by-plane mapping rather than a full color transformation using a color space and because the calibration data and calibrating ASIC processor reside on a special purpose circuit board, image data is processed for printing at a high speed.

What is claimed is:

1. In a printing system, a method of calibrating a printer having a plurality of printer colorants using a scanner adapted to sense a plurality of color components, comprising the steps of:

storing a color characterization profile for transforming input colorant data to measurements of the intensity of each printer colorant;

storing a scanner profile providing, independently for each scanner color component, a mapping of scanner data to measurements of the intensity of each printer colorant;

printing stored data to generate a printed image;

scanning the printed image to generate a scanned image;

converting the scanned image to measurements of the intensity of each printer colorant using the scanner profile;

comparing the stored data and the converted scanned image to generate a printer profile relating, independently for each printer colorant printed measurements of the intensity of each printer colorant to input colorant data; and combining the color characterization profile and the printer profile to generate calibration data for calibrating each printer colorant.

2. The method of claim 1 wherein the printed image comprises a plurality of color patches each having substantially uniform intensities of colorant and wherein the step of converting the scanned image to measurements of the intensity of each printer colorant using the scanner profile comprises the steps of:

for each color patch:
selecting a plurality of corresponding scanned values in the scanned image;
averaging the selected scanned values to generate a first average;
computing a measure of the standard deviation from the first average; and
computing a second average of the selected scanned values excluding from the second average any values deviating from the first average by an amount greater than a selected percentage of the standard deviation; and
converting the second averages to measurements of the intensity of each printer colorant from the scanner profile.

3. The method of claim 1 wherein the step of storing a scanner profile providing, independently for each scanner color component, a mapping of scanner data to measurements of the intensity of each printer colorant, comprises the steps of:

storing measurements of the intensity of each printer colorant corresponding to a second image; scanning the second image to generate a second scanned image;

comparing the stored measurements of the intensity of each printer colorant to the second scanned image independently for each scanner color component to generate a scanner profile; and storing the scanner profile.

4. The method of claim 3 wherein the second image comprises a plurality of color patches each having substantially uniform intensities of colorants and wherein the step of comparing the stored measurements of the intensity of each printer colorant to the second scanned image to generate a scanner profile comprises the steps of:

for each color patch:
selecting a plurality of corresponding scanned measurements of the intensity of each printer colorant in the second scanned image;
averaging the selected measurements of the intensity of each printer colorant to generate a first average;

computing a measure of the standard deviation from the first average; and computing a second average of the selected measurements of the intensity of each printer colorant excluding from the average any measurements of the intensity of each printer colorant deviating from the first average by an amount greater than a selected percentage of the standard deviation; and comparing the stored measurements of the intensity of each printer colorant to the second averages to generate a scanner profile.

5. The method of claim 3 wherein the printed image and the second image are scanned simultaneously.

6. The method of claim 1 wherein the step of storing a color characterization profile for transforming input colorant data to measurements of the intensity of each printer colorant comprises the step of storing a plurality of color characterization profiles and wherein the step of combining the color characterization profile and the printer profile to generate calibration data for independently calibrating each printer colorant comprises combining the printer profile with the plurality of color characterization profiles to generate a plurality of calibration profiles.

7. In a printing system adapted to print colorant data corresponding to a plurality of printer colorants, a method of calibrating a printer comprising the steps of:

printing stored data to generate a first printed image having a first set of intensities of colorant;

scanning the first printed image to generate a first scanned image;

storing measurements of the intensity of each printer colorant corresponding to a second image;

scanning the second image to generate a second scanned image;

forming an association for each printer colorant between printed intensities of colorant and colorant data, wherein the association is formed from a comparison of the first and second scanned images, the stored data and the stored intensities of colorant;

storing a characterization profile for converting colorant data to measurements of the intensity of each printer colorant; and generating a second association for converting input colorant data to calibrated colorant data wherein the second association is formed from the characterization profile and the association between printed intensities of colorant and colorant data.

8. The method of claim 7 wherein the step of forming an association for each printer colorant between printed intensities of colorant and colorant data comprises the steps of:

generating a first conversion table for independently converting each color plane of scanned data to measurements of the intensity of each printer colorant;

assigning measurements of the intensity of each printer colorant to the first scanned image using the first conversion table; and comparing the assigned measurements of the intensity of each printer colorant to the stored data to generate an association for each printer colorant between printed intensities of colorant and colorant data.

9. The method of claim 8 wherein the step of generating a first conversion table for converting scanned data to measurements of the intensity of each printer colorant comprises the steps of:

calculating a set of statistical measures associated with the second scanned image;

adjusting the second scanned image responsive to the statistical measures to generate adjusted data; and associating the adjusted data to the measurements of the intensity of each printer colorant to generate the first conversion table.

10. The method of claim 8 wherein the step of assigning measurements of the intensity of each printer colorant to the first scanned image using the first conversion table comprises the steps of:

calculating a set of statistical measures associated with the first scanned image;

adjusting the first scanned image responsive to the statistical measures to generate adjusted data; and assigning measurements of the intensity of each printer colorant to the adjusted data using the first conversion table.

11. The method of claim 7 wherein the association for converting input colorant data to calibrated colorant data is a look-up table.

12. The method of claim 11 further comprising the step of data smoothing the look-up table.

13. The method of claim 7 wherein the steps of scanning the first printed image and scanning the second image are performed simultaneously.

14. A system for calibrating a printer having a plurality of printer colorants, comprising:

a characterization profile for converting image data to measurements of the intensity of each printer colorant;

an updateable printer profile for mapping measurements of the intensity of each printer colorant to printer colorant data for each printer colorant independent of the other printer colorants; and an updateable calibration profile combining the characterization profile and the updateable printer profile, for converting image data to calibrated printer colorant data for printing on the printer.

15. The system of claim 14 further comprising:

a first set of stored data;

a printed image formed by printing the stored data using the printer;

a scanned image formed by scanning the printed image;

a scanner profile for independently converting each color component of scanned data to measurements of the intensity of each printer colorant; and a printer profile update module coupled to the scanner profile, the first set of stored data and the scanned image for generating an updated printer profile.

16. The system of claim 15 wherein the scanner profile is updateable and further comprising: stored density data;

a test image having intensities of colorant corresponding to the stored density data;

a scanned image formed by scanning the test image; and a scanner profile update module coupled to the stored density data and the scanned image for generating an updated scanner profile.

17. In a printing system, a method of calibrating a printer having a plurality of printer colorants using a scanner adapted to sense a plurality of color components, comprising the steps of:

storing a color characterization profile for transforming input colorant data to amounts of each printer colorant;

storing a scanner profile providing, independently for each scanner color component, a mapping of scanner data to amounts of each printer colorant;

printing stored data to generate a printed image;

scanning the printed image to generate a scanned image;

converting the scanned image to amounts of each printer colorant using the scanner profile;

comparing the stored data and the converted scanned image to generate a printer profile relating, independently for each printer colorant, printed amounts of each printer colorant to input colorant data; and combining the color characterization profile and the printer profile to generate calibration data for calibrating each printer colorant.

18. In a printing system adapted to print colorant data corresponding to a plurality of printer colorants, a method of calibrating a printer comprising the steps of:

printing stored data to generate a first printed image having a first set of colorant amounts;

scanning the first printed image to generate a first scanned image;

storing colorant amounts corresponding to a second image;

scanning the second image to generate a second scanned image;

forming an association for each printer colorant between printed colorant amounts and colorant data, wherein the association is formed from a comparison of the first and second scanned images, the stored data and the stored colorant amounts;

storing a characterization profile for converting colorant data to colorant amounts; and generating a second association for converting input colorant data to calibrated colorant data wherein the second association is formed from the characterization profile and the association between printed colorant amounts and colorant data.

19. A system for calibrating a printer having a plurality of printer colorants, comprising:

a characterization profile for converting image data to amounts of each printer colorant;

an updateable printer profile for mapping the amounts of each printer colorant to printer colorant data for each printer colorant independent of the other printer colorants; and an updateable calibration profile combining the characterization profile and the updateable printer profile, for converting image data to calibrated printer colorant data for printing on the printer.

20. In a printing system, a method of calibrating a printer having a plurality of printer colorants using a scanner adapted to sense a plurality of color components, comprising the steps of:

storing a color characterization profile for transforming input colorant data to measurements of the intensity of each printer colorant;

storing a scanner profile providing, independently for each scanner color component, a mapping of scanner data to measurements of the intensity of each printer colorant;

printing stored data to generate a printed image, comprising the steps of:

generating a set of color patch data;

determining a random arrangement of the color patches on the printed image; and printing the color patch data to form a printed image having a plurality of color patches arranged in accordance with the determined arrangement;

scanning the printed image to generate a scanned image;

converting the scanned image to measurements of the intensity of each printer colorant using the scanner profile;

comparing the stored data and the converted scanned image to generate a printer profile relating, independently for each printer colorant, printed measurements of the intensity of each printer colorant to input colorant data; and combining the color characterization profile and the printer profile to generate calibration data for calibrating each printer colorant.

21. The method of claim 20 further comprising the steps of:

storing an arrangement key for reconstructing the color patch arrangement; and including on the printed image the arrangement key.

22. The method of claim 20 wherein the step of printing stored data to generate a printed image comprises the steps of:

generating a set of color patch data;

determining an arrangement of the color patches;

determining an invert option is selected;

inverting the arrangement along a first axis responsive to the invert option being selected; and printing the color patch data to form a printed image having a plurality of color patches arranged in accordance with the inverted arrangement.

* * * * *